United States Patent
Vigouroux et al.

(10) Patent No.: US 9,523,205 B2
(45) Date of Patent: Dec. 20, 2016

(54) DEVICE FOR COVERING A BUILDING STRUCTURE AND STRUCTURE COVERED BY SUCH A DEVICE

(71) Applicant: BACACIER 3 S, Cournon-d'Auvergne (FR)

(72) Inventors: Jean-Christophe Vigouroux, Paulhac (FR); Julien Faisandier, Beaumont (FR); Joffrey Bertrand, Clermont-Ferrand (FR)

(73) Assignee: BACACIER 3 S, Cournond'Auvergne (FR)

( * ) Notice: Subject to any disclaimer, the term of this patent is extended or adjusted under 35 U.S.C. 154(b) by 0 days.

(21) Appl. No.: 14/397,473

(22) PCT Filed: Apr. 26, 2013

(86) PCT No.: PCT/EP2013/058767
§ 371 (c)(1),
(2) Date: Oct. 27, 2014

(87) PCT Pub. No.: WO2013/160457
PCT Pub. Date: Oct. 31, 2013

(65) Prior Publication Data
US 2015/0322679 A1 Nov. 12, 2015

(30) Foreign Application Priority Data
Apr. 27, 2012 (FR) ...................... 12 53947

(51) Int. Cl.
*E04F 13/12* (2006.01)
*E04F 13/08* (2006.01)
*F16B 5/02* (2006.01)

(52) U.S. Cl.
CPC ....... *E04F 13/0832* (2013.01); *E04F 13/0837* (2013.01); *E04F 13/0862* (2013.01);
(Continued)

(58) Field of Classification Search
CPC ........ E04D 3/3607; E04D 3/363; E04D 3/351; F16B 5/0275; E04F 13/0862; E04F 13/0837; E04F 13/0848; E04F 13/0801; E04F 13/0832; E04F 13/871; E04F 13/12; E04F 13/08
(Continued)

(56) References Cited

U.S. PATENT DOCUMENTS 3,852,929 A * 12/1974 Cookson ............... E04D 3/3607
  52/543
3,906,696 A * 9/1975 Poter ....................... E04D 3/351
  52/536
(Continued)

*Primary Examiner* — Phi A
(74) *Attorney, Agent, or Firm* — Knobbe Martens Olson & Bear LLP

(57) ABSTRACT

The invention relates to a covering device comprising: at least one metal sheet, especially a metal sheet used for cladding, suitable for covering at least one section of a surface of a building structure, fastenings for definitively attaching the metal sheet to the structure, at least one accessory suitable for applying to a receiving area on the metal sheet, and means for removably attaching the accessory to the receiving area, that are suitable for attaching the accessory once the metal sheet is already attached to the structure by means of the fastenings, maintaining the structural integrity of the metal sheet, and also the integrity, especially in terms of tightness, of the attachment of the metal sheet to the structure by means of the fastenings, said attaching means including a head of the fastenings, that can enable the assembly, and if need be, the disassembly, of the accessory, without affecting the attachment of the metal sheet to the structure by means of the fastenings.

15 Claims, 14 Drawing Sheets

(52) U.S. Cl.
CPC .......... *E04F 13/0871* (2013.01); *E04F 13/12* (2013.01); *E04F 13/0801* (2013.01); *F16B 5/0275* (2013.01)

(58) Field of Classification Search
USPC ................ 52/543, 518, 520, 511, 506.05
See application file for complete search history.

(56) References Cited

U.S. PATENT DOCUMENTS

| | | | | |
|---|---|---|---|---|
| 4,111,328 A * | 9/1978 | Eggert | ............... | H05K 5/04 220/3.94 |
| 4,467,582 A * | 8/1984 | Hague | ............... | E04D 3/363 52/419 |
| 4,486,998 A * | 12/1984 | Hague | ............... | E04D 3/3607 52/478 |
| 5,287,670 A * | 2/1994 | Funaki | ............... | E04D 3/3608 52/478 |
| 6,443,418 B1 * | 9/2002 | Itamochi | ............... | E02D 27/02 249/190 |
| 6,974,622 B2 * | 12/2005 | Wade | ............... | E04C 2/20 428/134 |
| 7,954,282 B2 * | 6/2011 | Crostic, Jr. | ............... | E06B 9/02 52/202 |
| 8,468,774 B2 * | 6/2013 | Garry | ............... | B21D 47/01 52/836 |
| 9,010,054 B2 * | 4/2015 | Herdt | ............... | B29C 44/1214 52/220.2 |
| 2004/0007150 A1 * | 1/2004 | Gleave | ............... | E04G 21/3261 104/106 |
| 2007/0113494 A1 * | 5/2007 | Kim | ............... | E06B 9/02 52/202 |
| 2008/0127586 A1 * | 6/2008 | Carolan | ............... | E04C 2/292 52/309.9 |

* cited by examiner

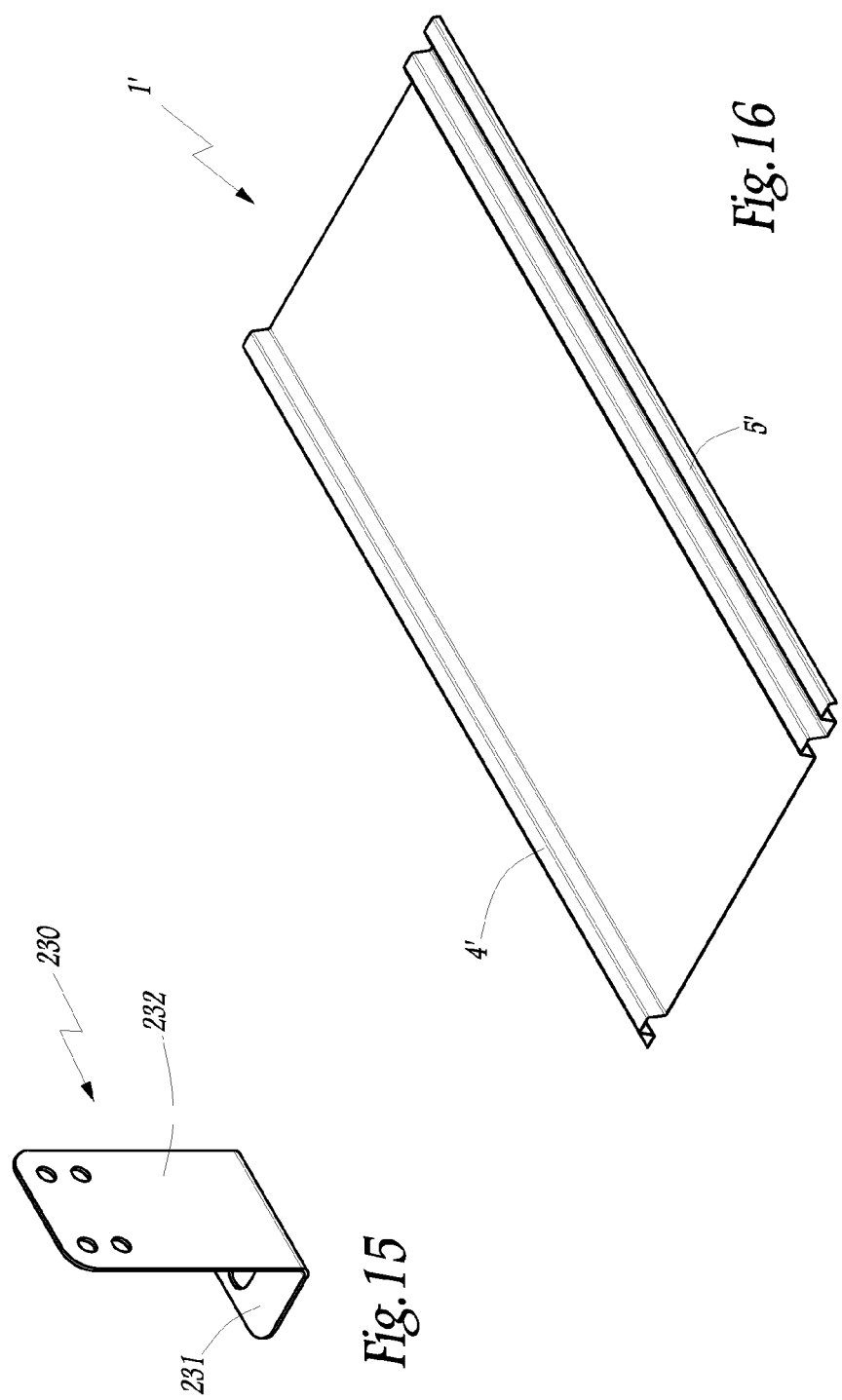

DEVICE FOR COVERING A BUILDING STRUCTURE AND STRUCTURE COVERED BY SUCH A DEVICE

CROSS-REFERENCE TO RELATED APPLICATIONS

This application is the U.S. National Phase under 35. U.S.C. §371 of International Application PCT/EP2013/058767, filed Apr. 26, 2013, which claims priority to French Patent Application No. 1253947, filed Apr. 27, 2012. The disclosures of the above-described applications are hereby incorporated by reference in their entirety.

The invention relates to a device for covering walls in a built structure, of the type referred to as the cladding system commonly used in buildings. In such a system one or more exterior surfaces of the building are covered with panels or facing sheets, known as cladding sheets. These sheets are attached to elements that form part of the supporting structure of the building or that are attached on to this structure.

BACKGROUND OF THE INVENTION

The term structure here is used to refer to a structural framework, for example made out of metal profiles or the continuous face of an interior or exterior wall, made for example of concrete, whether this wall is vertical, horizontal or inclined. This may for example be a separation wall, a supporting wall or a retaining wall for an embankment. The term structure also refers to structural framing elements in the roof of a building, whether the latter is meant for domestic—residential or commercial—professional use. The facing sheets in the known covering devices of this type are formed by panels or sheets made of rigid material, for example metal sheets, fastened to the structure. By way of a variant, they may be non-metallic panels, for example made of polymer material, whether or not transparent, or of composite material which will also be referred to as "sheets" in the following sections.

These sheets are generally rectangular in shape and are provided with at least two parallel ribs distributed on two parallel edges of the sheet. The ribs are adapted in order to either overlap, or be overlapped by a similar rib of another sheet, when the sheets are placed side by side or abutting one another. The partial overlapping of the sheets contributes to the sealing of the covering of the structure.

The fastening of the facing sheets in the structure is effected by means of screws or rivets driven into the constituent elements of the structure or the intermediate elements attached on to the structure, for example made of metal or wood, in order to provide for gaps interspersed in the thickness of the covered wall, for the purposes of insulation, air circulation or through passage of functional components, such as cables, for example. It is thus that in such a configuration, it is possible to either provide or not, a space between the sheets and the structure that allows, for example, for the introduction and placing of an insulating material and/or the through passage of pipes or cables.

Such fastening should as far as possible be air and water tight in order to ensure compliance with insulation performance requirements required by regulation. It is usually effected by drilling of the metal sheet during the riveting thereof or screwing thereof into the structure. As necessary, at each rivet or screw fastening a seal is provided so as to ensure the sealing tightness.

By way of an example that illustrates the above, the document EP-A-1 233 118 proposes the permanent fastening, on a structure constituted of a wall and profiled sections integrally attached to the wall, of rectangular sheets, by means of rivets.

Furthermore, during the construction, it is possible to provide for certain variations in the function and/or appearance of coverings thus produced. It is possible for example to alternate the zones/areas or sections of sheets with different colours or to interpose transparent zones therebetween in order to allow light to penetrate into the interior. It is also possible, to a certain extent and by making use of connection pieces or transitional profiles, to alternate zones in which the dimensions in width (between ribs) or in length are different. However, once the covering is in place, it remains there for periods that can be fairly long, often over several decades without it being possible for any substantial change in the appearance or functions thereof to be made at the risk of altering the structural integrity and protective qualities, in particular the sealing tightness or weather resistance thereof.

Thus it so happens that if users wish to place on the sides of the building, signage or warning signs, or even advertising hoardings or billboards, they are forced to drill new holes in the cladding sheet or sheets in order to effect the attachment of such signage paraphernalia as necessary. The same applies to the addition of functional elements, such as lighting points, cable trays or other members. These drilled holes contribute to degrading the integrity of the sheets in which they have been borne and affect their longevity and appearance over time. This deficiency is further compounded when the elements added are to be dismantled in order for them to be replaced by others that require drilling new holes.

Thus the existing systems are afflicted by a dual limitation or deficiency. On the one hand they do not allow for the possibility of easily implementing coverings with variations in appearance or multiple motifs or patterns in each surface covered, independently of the constraints imposed by the undiversified configuration of the sheets available and by the needs linked to their overlapping on the edge. On the other hand, they have very poor capacity to support the addition of detachable elements that are likely to be modified or moved one or more times during the useful life of the constructed structure covered.

In order to circumvent this problem, the prior art document EP-A-1 233 118, previously cited above proposes attaching on to the sheets mentioned here above, which are already fixed to the structure, cassettes that are only clip fastened onto the edges of the sheets, by snap action engagement of complementary forms. This solution, which requires drilling of the sheets only for their definitive attachment to the structure with the rivets and which therefore eliminates the need to drill the sheets in order to mount the cassettes, thus provides the ability to hide the rivets cited above. However, on account of the snap action connection, the overall strength and resilience and the stability of this solution remain limited, unless provisions are made for some expensive adjustments or modifications.

BRIEF SUMMARY OF THE INVENTION

The objective of the present invention is to offer an alternative solution which, while being economical and mechanically efficient, provides the ability to vary the visual aspect or the functional properties of a covering sheet for covering a structure, as may be necessary after the installation, based on the evolving aesthetic or functional needs without compromising the physical integrity thereof and the appropriate qualities suitable for the fastening of the sheet on to the structure.

To this end, the object of the present invention relates to a device for covering at least one structure in a building, comprising:

at least one metal sheet suitable for covering at least one section in a surface of the structure, fastening attachments for definitively attaching the metal sheet on to the structure, at least one accessory suitable for being attached to a receiving area, arranged on the metal sheet, and fastening means for removably attaching the accessory to the receiving area, that are suitable for attaching the accessory once the metal sheet is already attached to the structure by means of the fastening attachments, while maintaining both the structural integrity of the metal sheet and the integrity and sealing tightness of the attachment of the metal sheet to the structure by means of the fastening attachments, said fastening means including a head of the fastening attachments, that is capable of enabling the assembly, and if need be, the disassembly, of the accessory, without affecting the attachment of the metal sheet on to the structure by means of the fastening attachments.

Thus, one of the ideas upon which the invention is based is to take advantage of fastening attachments for the prior fastening of the sheet on to the structure in a manner such that one head of these fastening attachments forms, at least in part, the fastening means for fastening one or more accessories, capable of ensuring that neither the quality or integrity, in particular functional, of the fastening between the sheet and the structure, nor the sheet itself, is affected. This ensures the ability to modify the appearance and/or certain functional features of the covering of a building, to give it a modularity or to create motifs or patterns in the panels covered according to this system. It will be understood that these fastening means for fastening the accessory on to the sheet may be adapted so as to provide for removable fastening of the accessory which may thus be disassembled and reassembled without undermining the integrity or strength of the basic constructed structure.

Thanks to the appropriate disposal of accessories attached on to the sheets, the system makes it possible to adhere to the forms or the properties of a predetermined design, specific to each project, based on basic elements that may be the same. It also provides the ability following completion of the constructed structure and the setting in operation thereof to add accessories and to remove them, or adapt them to evolving uses and the different needs that may arise, for example in terms of signage or display or various functional features. The changing of the accessory or accessories on the sheet, the addition of such elements may be undertaken by avoiding any drilling or intrusive operations on the sheet already in place or in its structure and the assembly means by which they have been connected at the initial mounting. The modification of the appearance of the structure is thereby facilitated, the integrity, in particular the sealing tightness, of the attachment of the sheet on to the structure is in any event maintained.

The invention also extends to a building structure, being covered with a device as defined above and having a plurality of accessories attached to the receiving area of the device by forming one or more visual motifs or patterns selected or determined on the basis of a pre-established design.

BRIEF DESCRIPTION OF THE DRAWINGS

The invention will be better understood and other advantages thereof will become more clearly apparent upon reading the description that follows of a covering device produced in accordance with several embodiments of the invention, provided solely by way of example and with reference made to the accompanying drawings in which:

FIG. 15 is a view on a larger scale of the detail XV shown in FIG. 13; and

FIG. 16 is a perspective view of a variant of the sheet shown in FIG. 1.

DETAILED DESCRIPTION OF PREFERRED EMBODIMENTS

Figure 1:
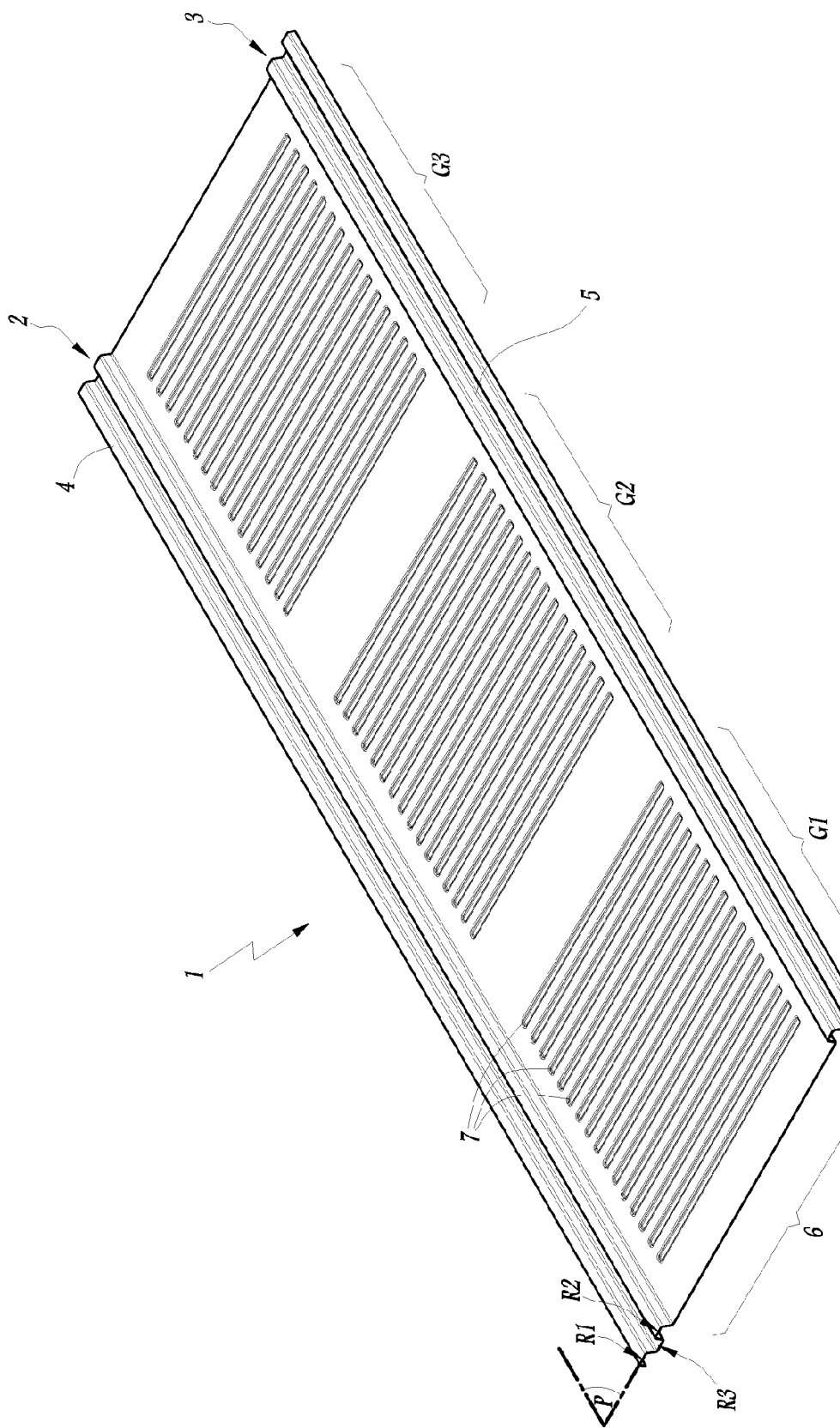
FIG. 1 is a perspective view of a ribbed sheet according to one embodiment of the invention.

FIG. 1 illustrates a metal sheet 1 of rectangular shape, provided on two parallel edges 2, 3, defining the length of the sheet 1, with ribs 4 and 5 that are parallel and open. These ribs 4, 5 have in cross section, a double S shaped form. In other words, they have, in cross section, two reliefs R1, R2 located above a median plane P of the sheet 1, on either side of a relief R3 located below the median plane P, looking at FIG. 1. By way of a variant, the ribs have a different form, as shown, by way of a non limiting example, in FIG. 16 in which the corresponding sheet and its ribs are respectively referenced as 1', 4' and 5'.

The ribs 4, 5 of the sheet 1 here are constituent elements of the edges 2, 3. By way of a variant, they are arranged along the width of the sheet. In another variant embodiment, the ribs 4, 5 do not define the edges of the sheet but occupy the central portion of the latter. In other embodiments, the sheet may be square in shape.

In FIG. 1, the space separating the two ribs 4, 5 delimits the main body 6 of the sheet 1. This body 6 is here provided with three groups G1, G2, G3 of elongated reliefs 7 arranged in parallel to each other. These reliefs 7 have, in cross section, a half moon configuration. They extend between the ribs 4, 5, perpendicular to the latter. In other embodiments not illustrated, the main body 6 of the sheet 1 is flat or provided with ribs that are parallel to the edges 2, 3 or even provided with reliefs having complex geometry, for example in the shape of a half moon, leaf, star, wave, with these reliefs being either uniformly distributed or not. In other words, the configuration and/or the number of reliefs 7 distributed over the body 6 are appropriate to the desired visual appearance.

Figure 2:
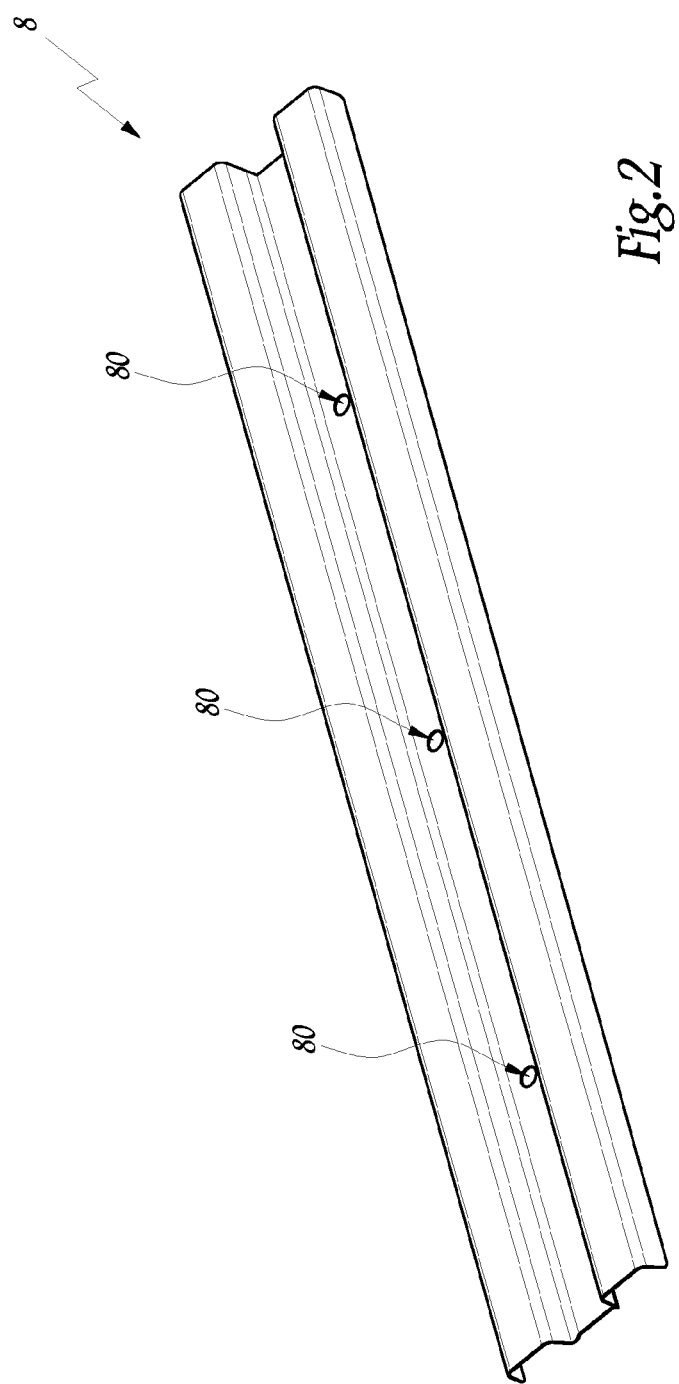
FIG. 2 is a perspective view, on another scale, of a decorative accessory perpendicular to the ribs of the sheet shown in FIG. 1.

An accessory 8, illustrated in FIG. 2, is capable, if required, of being mounted on the sheet 1. This accessory 8 forms a support member. It is present in the form of an elongated bar and configured as a rib 4 or 5, that is to say that in cross section it has a double S shaped form, it being understood that this cross section may be of a different configuration. The bar 8 is thus configured as a part of a rib 4 or 5. It is provided with at least one orifice, here three orifices 80 arranged in the middle part of the member, that is to say aligned along its greatest length and formed in the part of the accessory 8 corresponding to the relief R3 of a rib 4 or 5.

Figure 4:
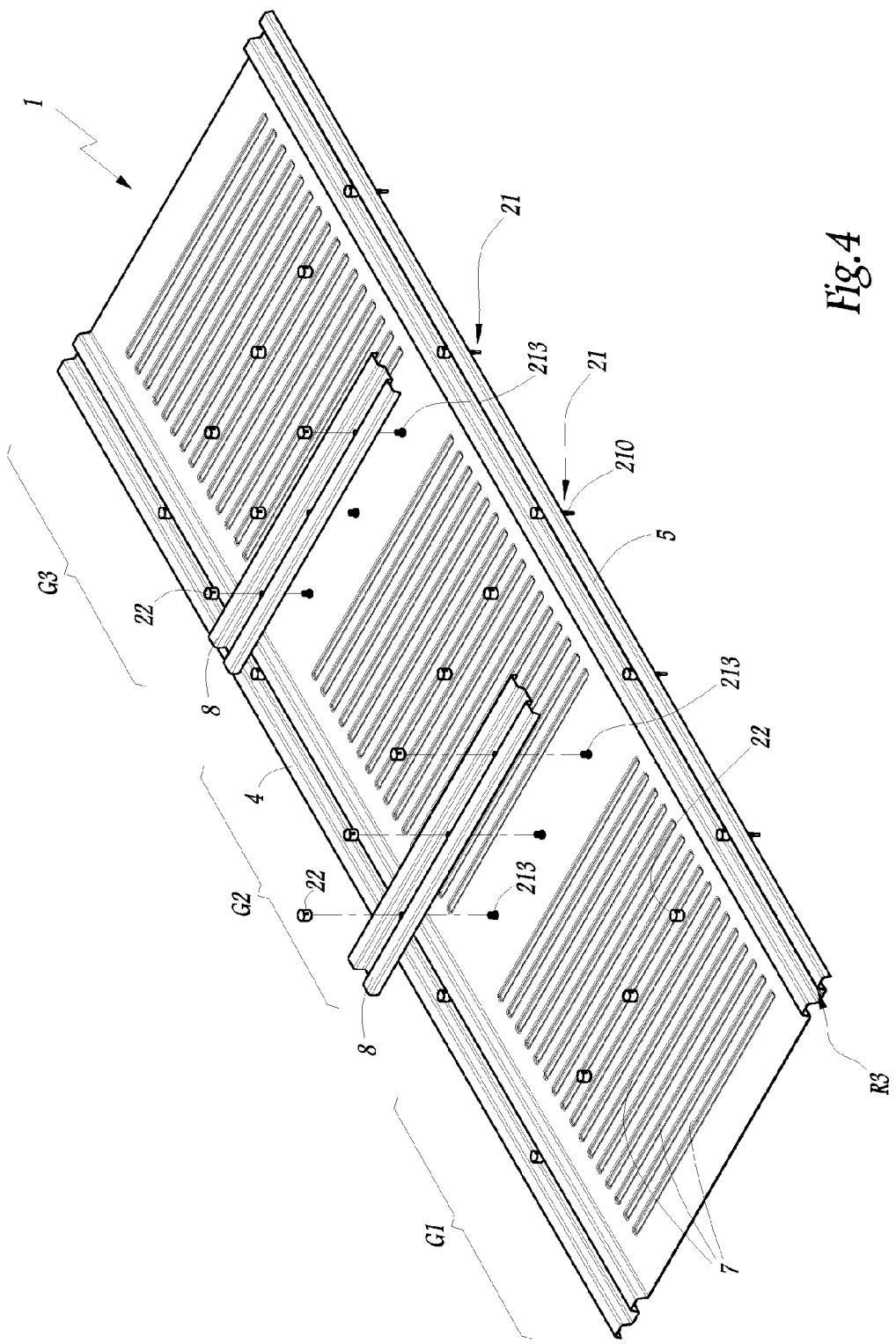
FIG. 4 is a perspective view, on the same scale as in FIG. 1, illustrating the removable mounting of the decorative members represented in FIG. 2 on the sheet shown in FIG. 1.

The bar 8 has a length adapted to the width of the body 6 so as to be mounted on the body 6 perpendicularly to the ribs 4 and 5 while being in contact, by means of its ends, with the flanks of the ribs 4 and 5, as can be seen in FIG. 4.

Figure 3:
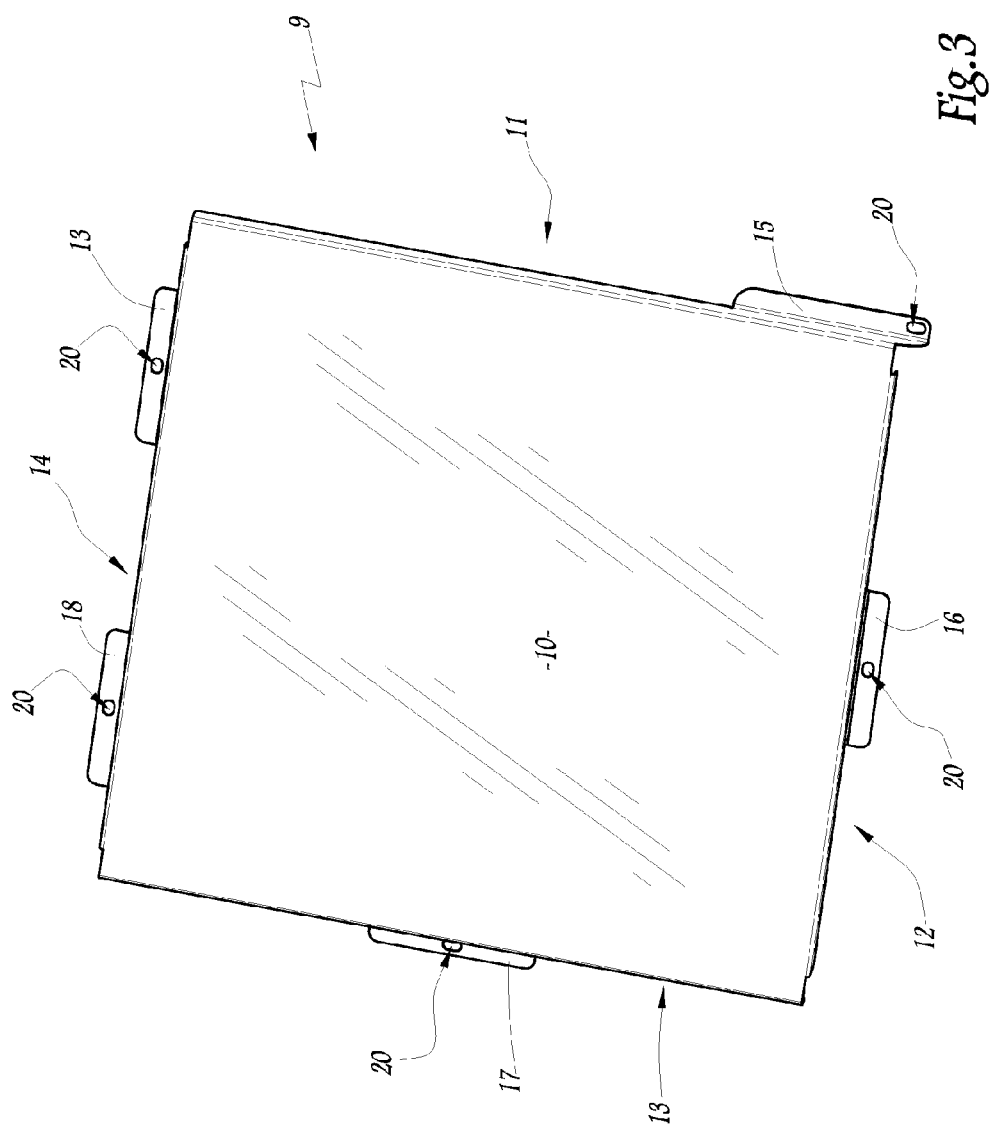
FIG. 3 is a perspective view, on another scale, of another type of accessory that may be used with the sheet shown in FIG. 1.

Another type of accessory 9 is shown in FIG. 3. It is configured as a square panel, made of a rigid material, for example out of metal, polymer or wood. This panel 9, also referred to as a cassette, may, at least on its surface 10 meant to be visible when in position on a metal sheet 1, be coloured, dyed, printed or provided with reliefs of different shapes conferring a decorative appearance thereto. By way of a variant, it may be of a shape other than square, for example rectangular, pentagonal, octagonal or other.

The panel 9 has its four sides bent, for example, here, at a right angle relative to its surface 10, thereby forming four lips 11 to 14 angled relative to the upper surface 10 of the panel 9. The lips 11 to 14 are oriented towards the sheet 1 when the panel 9 is in position over this latter.

Figure 14:
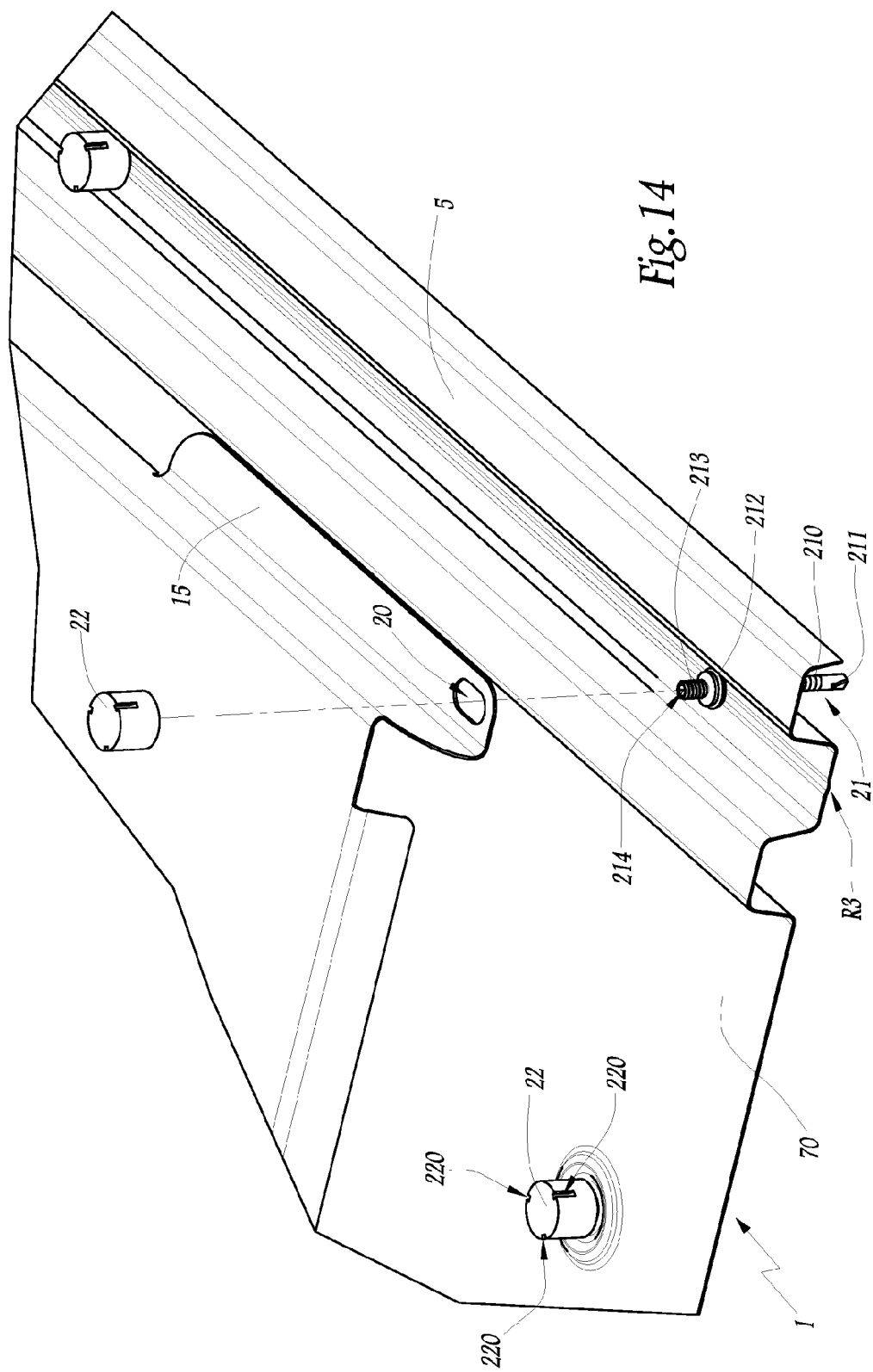
FIG. 14 is a partial perspective view, on a larger scale, of the detail XIV shown in FIG. 5 and illustrating the installation in place of the accessory on the sheet, the bolts being shown in pre mounting position.

The elongated tabs 15 to 19 extend from the free ends of the lips 11 to 14 as is apparent in FIG. 14, these tabs are each integrally fixed to the lip from which they extend. These tabs are oriented towards the exterior of the panel 9, parallel to the surface 10. In other words, the tabs 15 to 19 extend outwardly towards the exterior, perpendicular to the lips 11 to 14. Each tab 15 to 19 is provided with at least one orifice 20, formed substantially in a central position for the tabs 16 to 19 and in the vicinity of an end for the tab 15.

The tabs 15 to 19 are arranged differently on each lip. On the lip 11, the tab 15 is secured on to one end of the lip which is adjacent to an end of the lip 12. The lips 12 and 13 are provided, in a central position, with the tabs 16 and 17 respectively. As for the two tabs 18 and 19, they are in turn, located in the vicinity of the ends of the lip 14.

Such an arrangement of tabs 15 to 19 makes it possible, when the panel 9 is positioned beside an identical further panel 9, to bring opposite two lips the panels whose respective tabs 15 to 19 are offset with respect to one another, in order to minimise the space between the adjacent sheets without these latter being at all joined. In other words, there is no overlapping of the tabs 15 to 19 of two adjacent panels 9.

In alternative embodiments not shown, the arranged position of the tabs are different, so long as this arrangement makes it possible to avoid overlapping while also minimising the space between two adjacent sheets.

In FIG. 4 the sheet 1 is shown with two bars 8 in the pre mounting position on the sheet 1.

The fastening attachments for fastening, in a permanent and sealed manner, the sheet 1 on to one side of a structure, not illustrated so as to facilitate greater clarity, are formed by threaded rods 21. These rods 21 are inserted into the orifices passing through the sheet 1. The orifices are made either in the factory or, preferably, on site. In this case, the rods are advantageously provided with a self perforating tip.

Some rods 21 are inserted into the portions R3 of the ribs 4 and 5, other are inserted into the body 6, either between two groups G1 to G3 of reliefs 7, or between two reliefs 7 of a same given group G1 to G3. The number and distribution of the fastening means 21 for attaching the sheets on the structure depend on the criteria of the overlap between the sheets 1, the dimensions of the sheets 1, and the conditions for mounting, for example, wind resistance imposed by the regulation or weight of the accessories to be borne by the sheet 1. The sealing of the attachment of the sheet 1 on to the structure is brought about, for example, by means of a sealing gasket. In order to facilitate and optimise the attachment of the sheet 1 on to the structure, the distribution of rods 21 on the sheet 1 is identified by means of a pictogram, a perforation, a marking in relief, with the use of templates provided with the sheet or by any other known means of identification. The rods 21 are dual function fastening attachments.

The rods 21 include a part that is capable of holding a sheet 1 in place on a structure, in a sealed manner. This part comprises, as is more clearly apparent in FIG. 14, a threaded portion 210 located adjacent to the tip 211 of the rod 21. Support of the sheet 1 on the structure is achieved by means of a flange 212, integrally fixed to the rod 21. This flange 212 is placed adjacent to the end of the thread opposite the tip 211. In other words, the flange 212 materialises the separation between the threaded portion 210 and the head 213 of the rod 21. The head 213 is provided with an external thread and a terminal indentation 214. This indentation 214 advantageously provides the ability to drive the rod 21 in rotation, and more generally to manoeuvre this rod, so as to fix the portion 210 thereof into the structure. A sealing gasket is advantageously provided under the flange 212 and around the threaded portion 210.

The head 213 forms a fastening means for fastening an accessory on to the sheet 1.

In FIG. 4, the rods 21, in addition to the fastening of the sheet on the structure, thus also ensure fastening of the bars 8 on to the sheet 1. The bars or support members 8 and are thus mounted in a removable manner on to the sheet 1. in the embodiment shown in FIG. 4, the heads 213 of some rods 21 are inserted into the orifices 80 of the bars 8. They thus provide the ability to, in a removable manner, maintain in position the bars 8 supported on the sheet 1 by means of nuts 22, screwed onto the heads 214. These nuts 22 are capped and used as protective cover for the heads 213 of the bars 21 for all of the bars 21 that are used to ensure the attachment of the sheet 1 on to the structure as shown in FIG. 4.

As it appears in particular in FIG. 14, the nuts 22 here are cylindrical with a circular base. They are provided with three manoeuvring notches 220, arranged parallel to a longitudinal axis of each nut 22. These grooves 220 form manoeuvring members for manoeuvring a nut 22, using a suitable tool.

Thus a fastening attachment has been produced in the form of the rod 21, for the fastening of a removable accessory, such as the accessory 8 or 9, in a covering device as described here above. This fastening attachment may be described as:

consisting of an attachment body, or rod, comprising a first attaching section, such as the threaded portion 210, capable of being fixed into the structure, a clamping element, such as the flange 212, cooperating with the first attaching section and having a clamping face for applying an internal face of the sheet 70 against the structure when the first sector is fixed in the latter, and a second attaching section, such as the head 213, for receiving an accessory, such as the accessory 8 or 9, in particular the tab 15 of this latter, attached to the side of the outer face of the sheet 70, and being associated with a clamping means, such as the nut 22, that cooperates in a removable manner with the second attaching section so as to apply the accessory against an end stop that is integrally fixed to the clamping element.

The accessories 8 are thus fastened on to the sheet 1 without impairing the sealing tightness of the attachment of the sheet 1 on to the structure and without altering the structural integrity of the sheet 1, for example by drilling. In the embodiment illustrated in FIG. 4, the fastening means for removable and sealed fastening, respectively of the bar 8 on the sheet 1 and of the sheet 1 on to the structure, consist of one single member, namely a threaded rod 21, combined with the nut 22.

Figure 5:
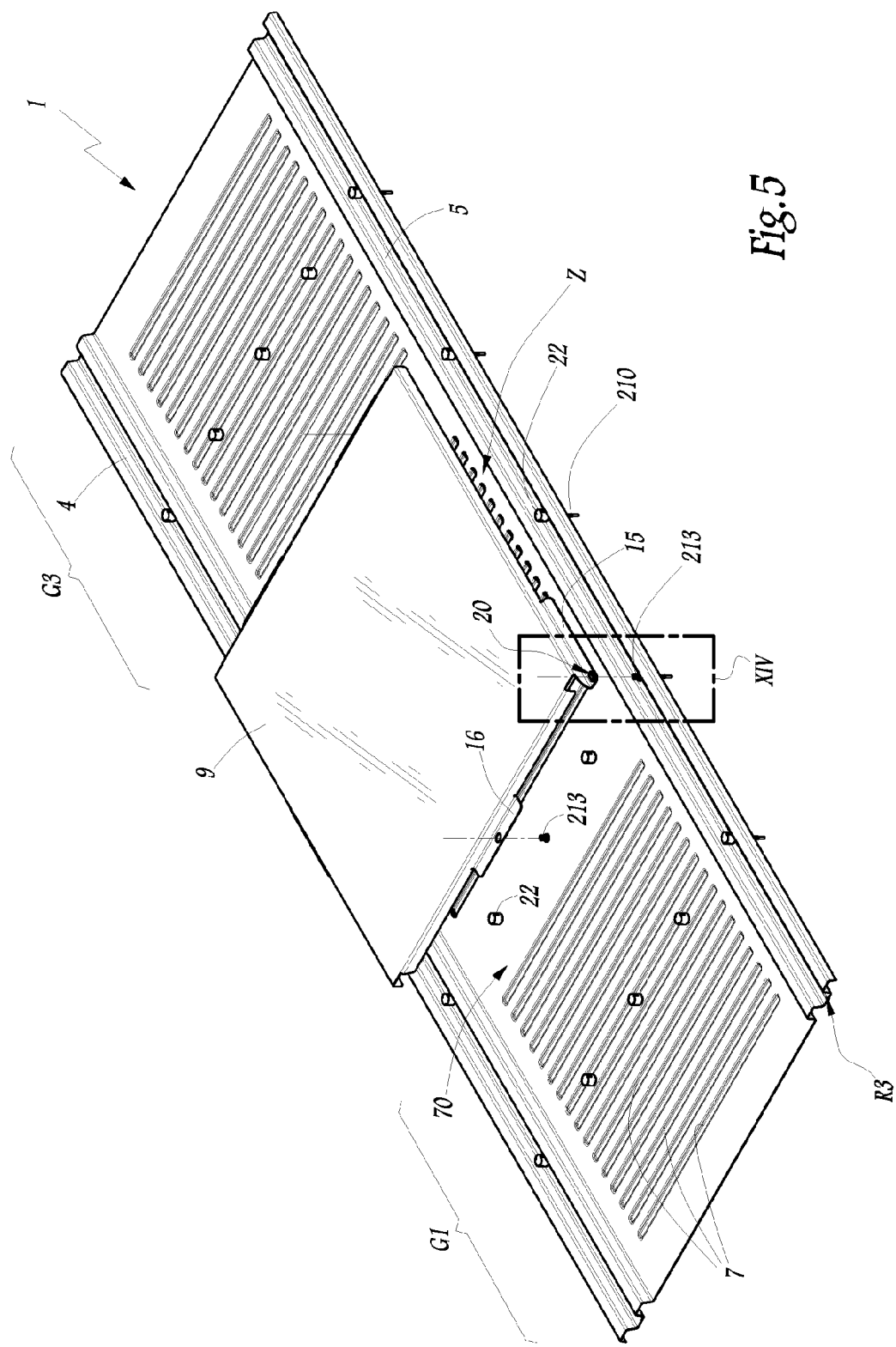
FIG. 5 is a perspective view, on the same scale, illustrating the setting in place of the accessory represented in FIG. 3 on the sheet shown in FIG. 1.

FIG. 5 illustrates the mounting of the accessory panel 9, illustrated in FIG. 3, on a sheet 1 illustrated in FIG. 1. Here, the panel 9 is in a position where the tabs 15 and 16 are visible. The tab 15 is positioned above the relief R3 of the rib 5 and the tab 16 above the main body 6 of the sheet 1. The orifices 20 of the tabs 15 and 16 permit the through passage of the heads 214 of two mounted rods 21, for one in the rib 5 and for the other in the body. The tabs 6 allow for the fastening of the panel 9 on the sheet 1, on to the lateral ribs 4, 5 as well as at the level of the planar zones 70 located between the groups G1 to G3 of reliefs 7.

Thus, in this embodiment, the receiving area Z for receiving the accessory is delimited between, on the one hand, the ribs 4, 5 and, on the other hand, two planar zones 70 located on either side of a group G2 of reliefs 7.

Figure 6:
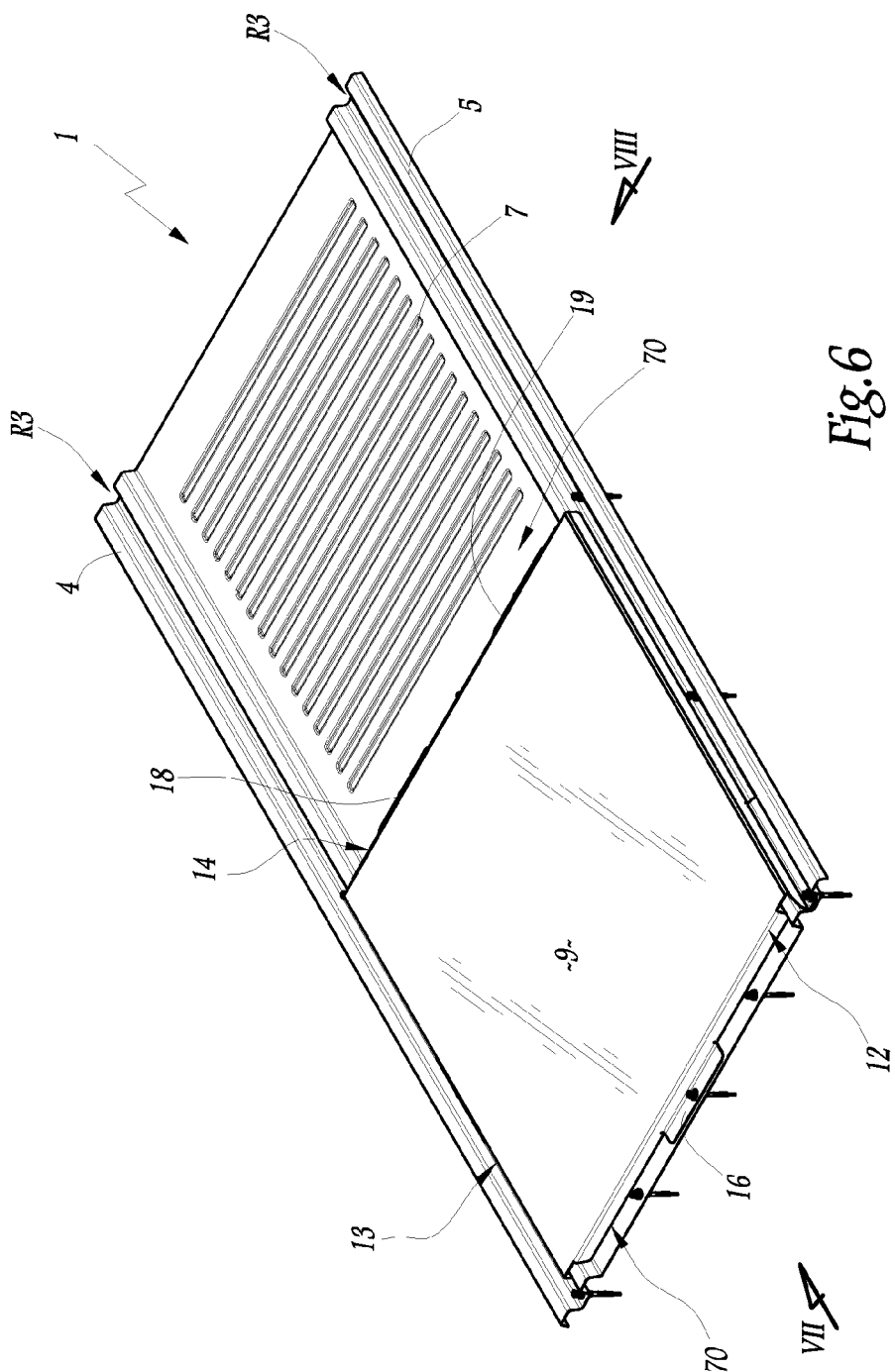
FIG. 6 is a partial perspective view, similar to that in FIG. 5 and at the same scale, when the accessory is fastened on to the receiving area of the sheet.

FIG. 6 represents a panel 9 when fastened in a removable manner, on the sheet 1. The fastening is similar to that of a bar 8 on the sheet 1. The tabs 15 to 19 are positioned such that the orifices 20 of each tab receive one head 213 of a rod 21. As it is more clearly apparent in FIG. 14, the nuts 22 are dimensioned such that, when they are in place on the heads 213, they hold the tabs 15, 16 of the panel 9 in position resting against the sheet 1. The lips 11 and 13 are supported, on the bottom of the reliefs R3 of the ribs 5 and 4. The lips 12 and 14 are supported on the planar zones 70, on either side of a group of reliefs 7.

Figure 7:
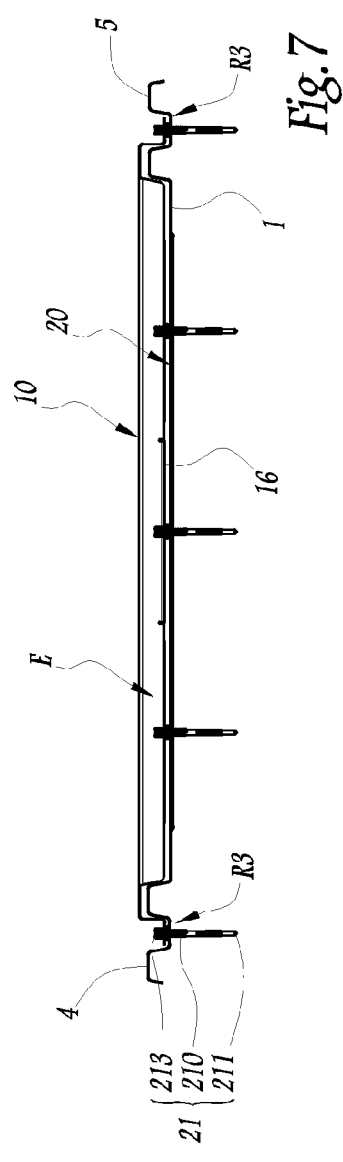
FIG. 7 is an end view, along the arrow VII shown in FIG. 6.
Figure 8:
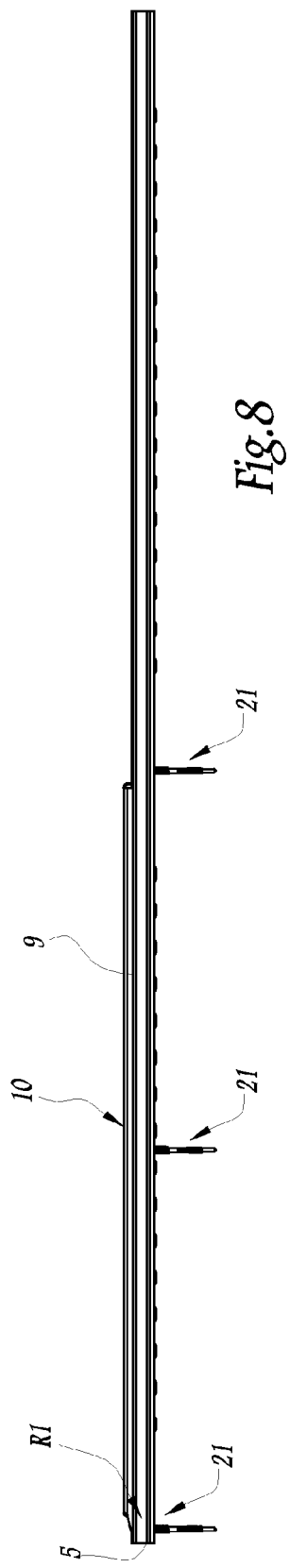
FIG. 8 is a side view along the arrow VIII shown in FIG. 6.

The dimensions of the panel 9, of the ribs 4 and 5 and of the sheet 1 are such as to ensure that that the extra thickness due to the setting in place of the panel 9 is minimal, as is shown in the FIGS. 7 and 8. Thus, while maintaining the overall dimensions of the sheet 1, by means of the fastening of the panel 9 on the sheet 1 a space E between the panel 9 and the body 6 is created that allows for, if necessary, the setting in place of an insulating material or the through passage of cables and/or ducting.

The visual appearance of the sheet 1 is modified, with only the surface 10 of the panel 9 being visible. It is understood that several panels 9 may, as desired, be mounted on the sheet 1. The mechanical behaviour and resistant strength of the sheet 1 are either not or only very slightly affected by the mounting of the panel or panels 9 insofar as there is no need for any drilling or perforation or cuts to be made on the sheet 1.

Figure 9:
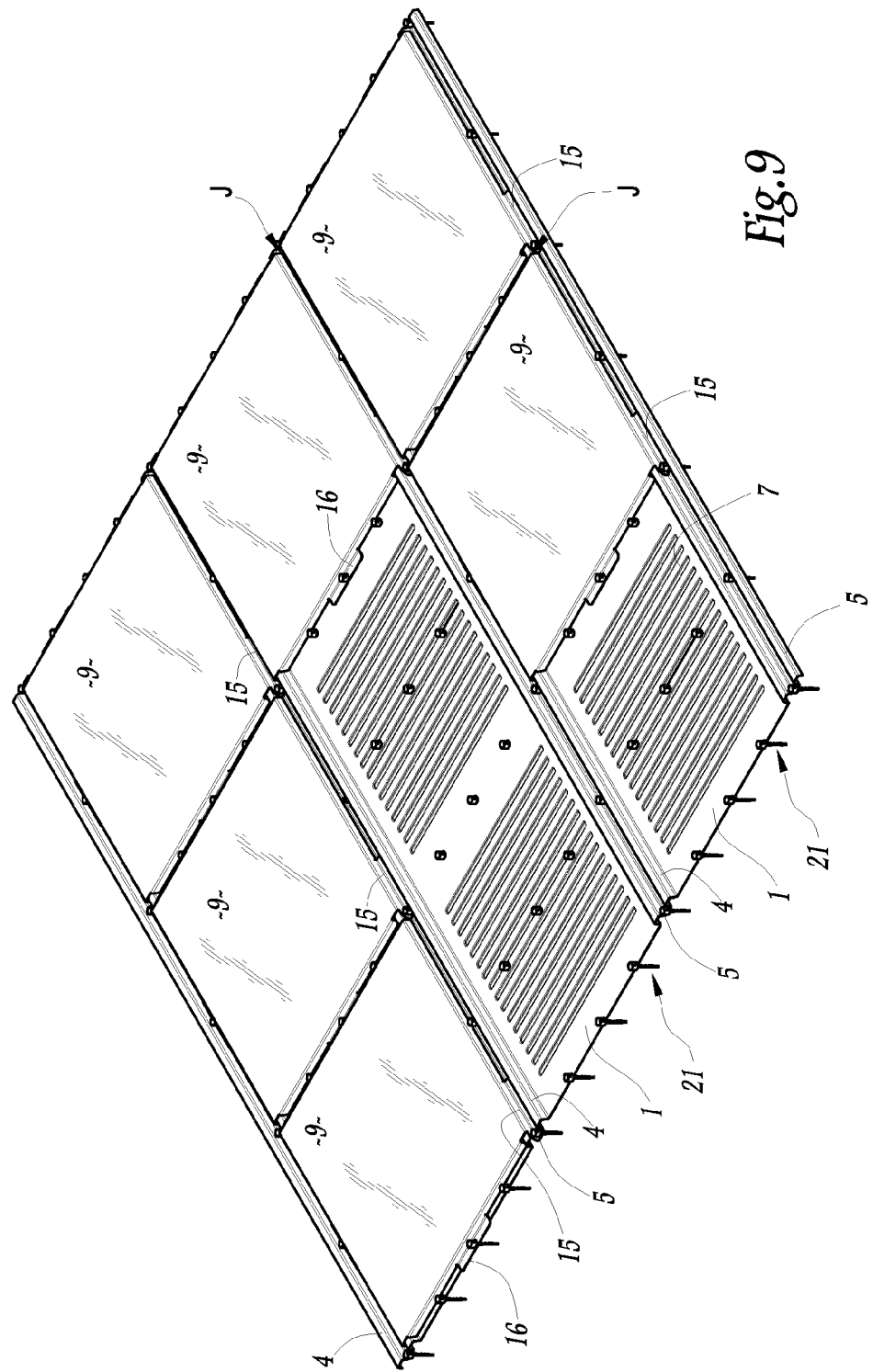
FIG. 9 is a perspective view, on a smaller scale, of several sheets shown in FIG. 5 arranged side by side, partially overlapping, the accessories represented in FIG. 3 being fastened on to certain receiving areas of the sheets.

FIG. 9 illustrates three sheets 1 assembled by means of partial overlapping of their ribs 4 and 5 and intended to cover a part of a structure, not shown. The panels 9 are attached over all or part of each sheet 1. In this case, the sheet 1 situated to the left when looking at the FIG. 9 is entirely covered with panels 9, the sheet 1 situated to the right is provided, over two thirds of its surface, with panels 9 and the central sheet 1 is equipped with only one panel 9.

Based on the needs, a choice is made as to the percentage of coverage of the sheets 1 by the panels 9 as well as the distribution of the latter over the sheets 1. It is to be noted that the surfaces 10 of the panels 9 are coplanar although not contiguous or joined. An opening J, the width of which corresponds substantially to the width of the tabs 15 to 19, is provided between two adjacent panels 9.

The arrangement of tabs 15 to 19 over the lips 11 to 14 makes it possible, when two panels 9 are side by side, for their respective tabs 15 to 19 to be interposed while not overlapping. Thus, it is possible to provide a rectilinear and uniform zone of juxtaposition between two panels 9, without extra thickness, the tabs 15 to 19 of the two panels being interposed in order to be in alignment with each other along a direction parallel to the surfaces 10 of these panels.

Figure 10:
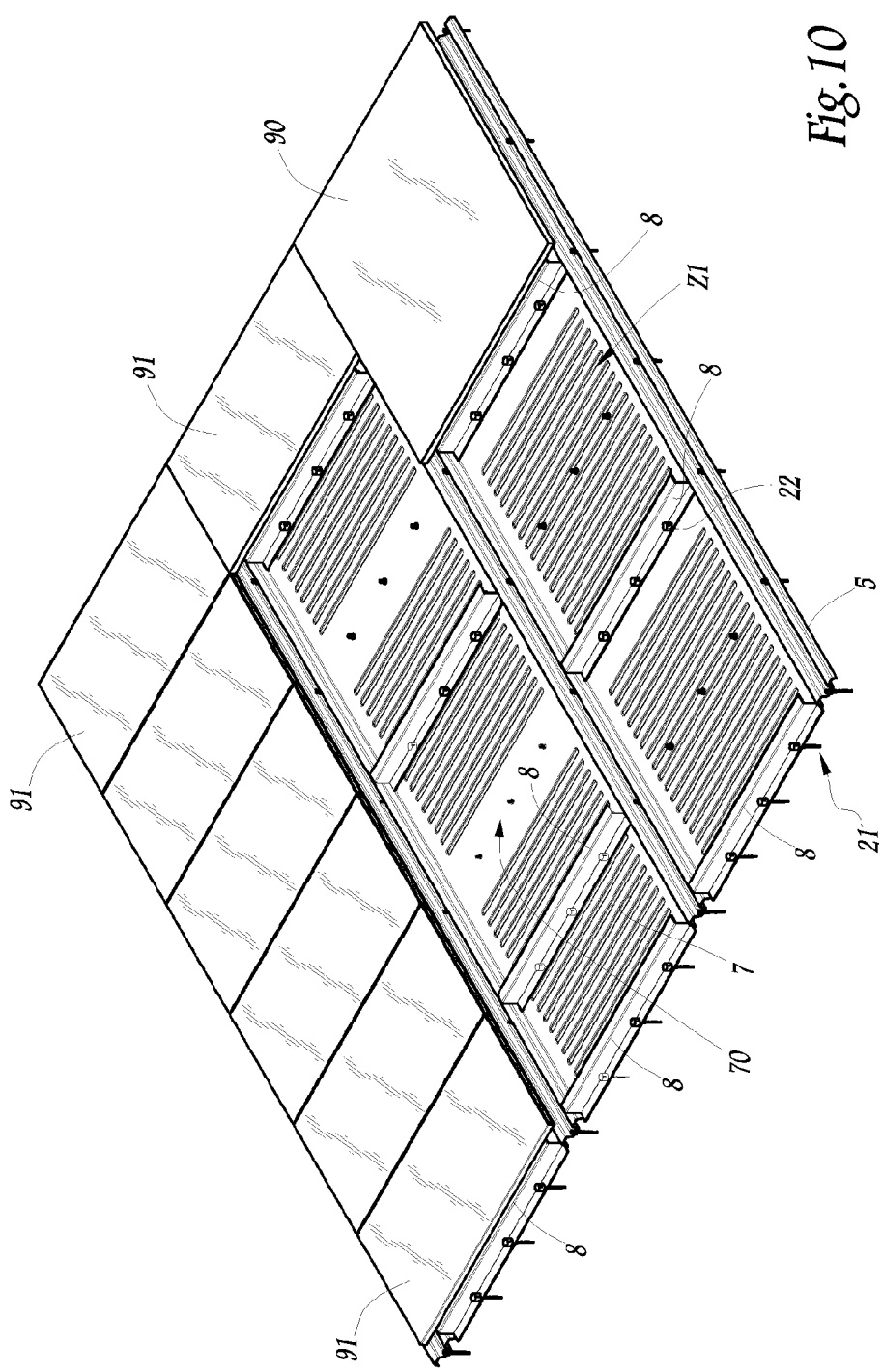
FIG. 10 is a perspective view, similar to that in FIG. 9 and on the same scale, the sheets shown in FIG. 1 being equipped with the support members illustrated in FIG. 2.

The FIG. 10 is obtained by juxtaposition of three sheets 1 according to FIG. 4. FIG. 10 illustrates another embodiment of the invention wherein the accessories comprise facing panels meant for decorative purposes 90 that are free of tabs and rectangular panels 91, also free of tabs. The mounting of the panels 90, 91 on three sheets 1 assembled by means of partial overlapping is carried out by using bars 8 having a Z shaped cross section which in this example has an additional utility role. These bars are spacers that play a supporting role or serve as adapters for ancillary materials and that are attached on to the sheet just like the other accessories of the invention. The panels 90, 91 are received on a receiving area Z1 delimited by two bars 8 and the ribs 4, 5.

Thus, each panel 90 or 91 is fastened on to the bars 8 that themselves are attached on to the body 6, as illustrated in FIG. 4. Such a solution allows for the visible surfaces of the panels 90 and 91 to be contiguous.

The fastening of the panels 90, 91 is carried out, for example, by screwing on to the accessories 8. By way of a variant, the fastening is effected by means of a system of clips or, in the case of definitive fastening, by gluing or welding. In such a configuration, it is the assembly of accessory 8 and panels 90 or 91 which is removable, not only a single panel 90, 91.

Each panel 9, 90, 91 is advantageously mounted, in a removable manner, both at the level of the ribs 4, 5 as well as the accessories 8.

Thanks to the invention, it is possible to change accessories as may be necessary, with the latter possibly being a panel 9, 90, 91 that is coloured, bearing a graphic, decorative reliefs or an imprint.

By way of a variant, this accessory may be a panel for a projector, a mounting panel for mounting a loud speaker enclosure type unit, a panel for mounting a flower pot or planter, a panel for mounting a letter in relief or other accessories provided that this accessory, or at least the part of the accessory to be fastened on the sheet, has a shape and form compatible with the geometrical configuration of the sheet 1 and, advantageously, is provided with orifices 20, these latter being preferably drilled in the factory.

Figure 11:
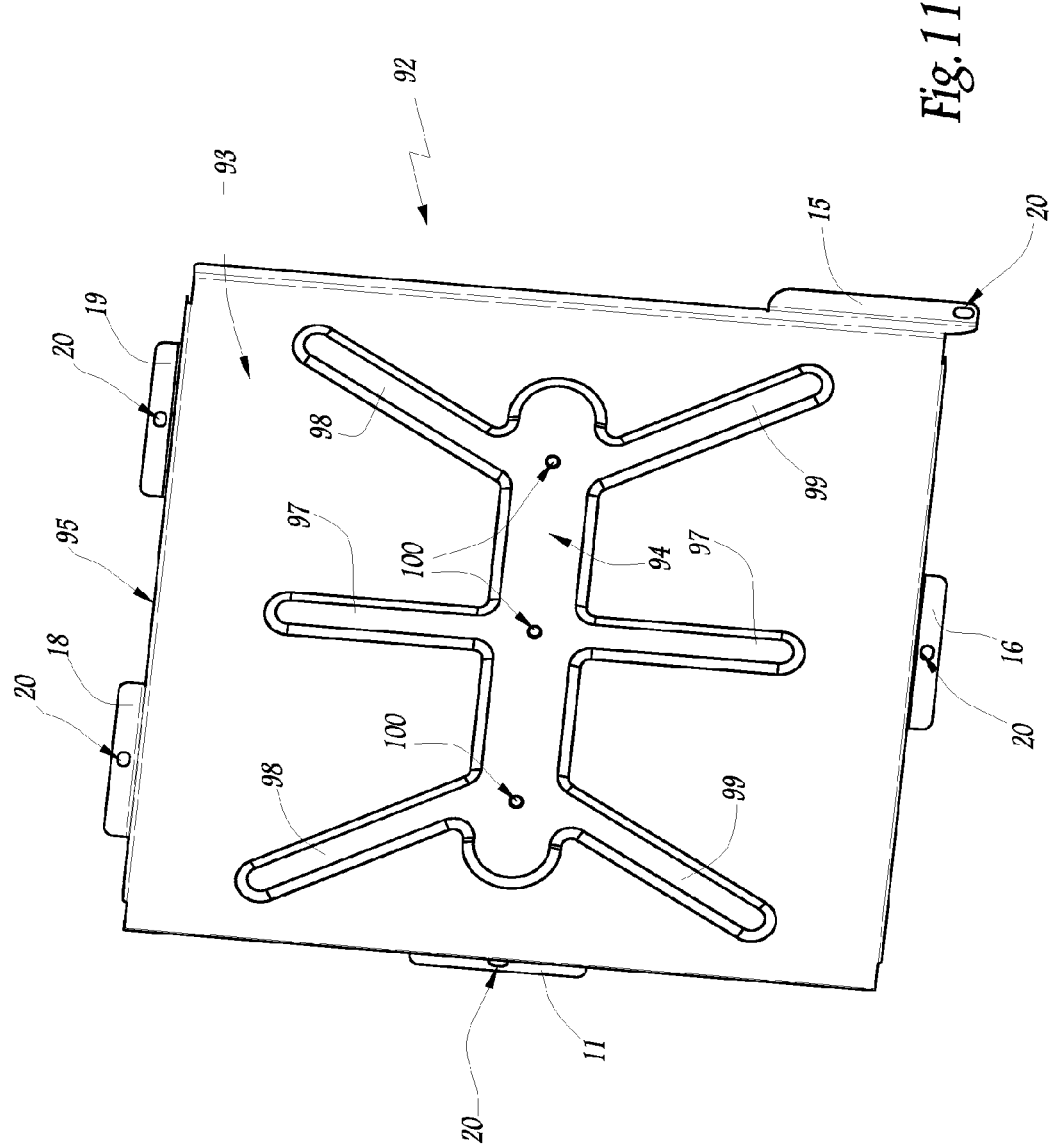
FIG. 11 is a perspective view, on the same scale as in FIG. 3, of another type of accessory also forming a support and in accordance with another embodiment of the invention.
Figure 12:
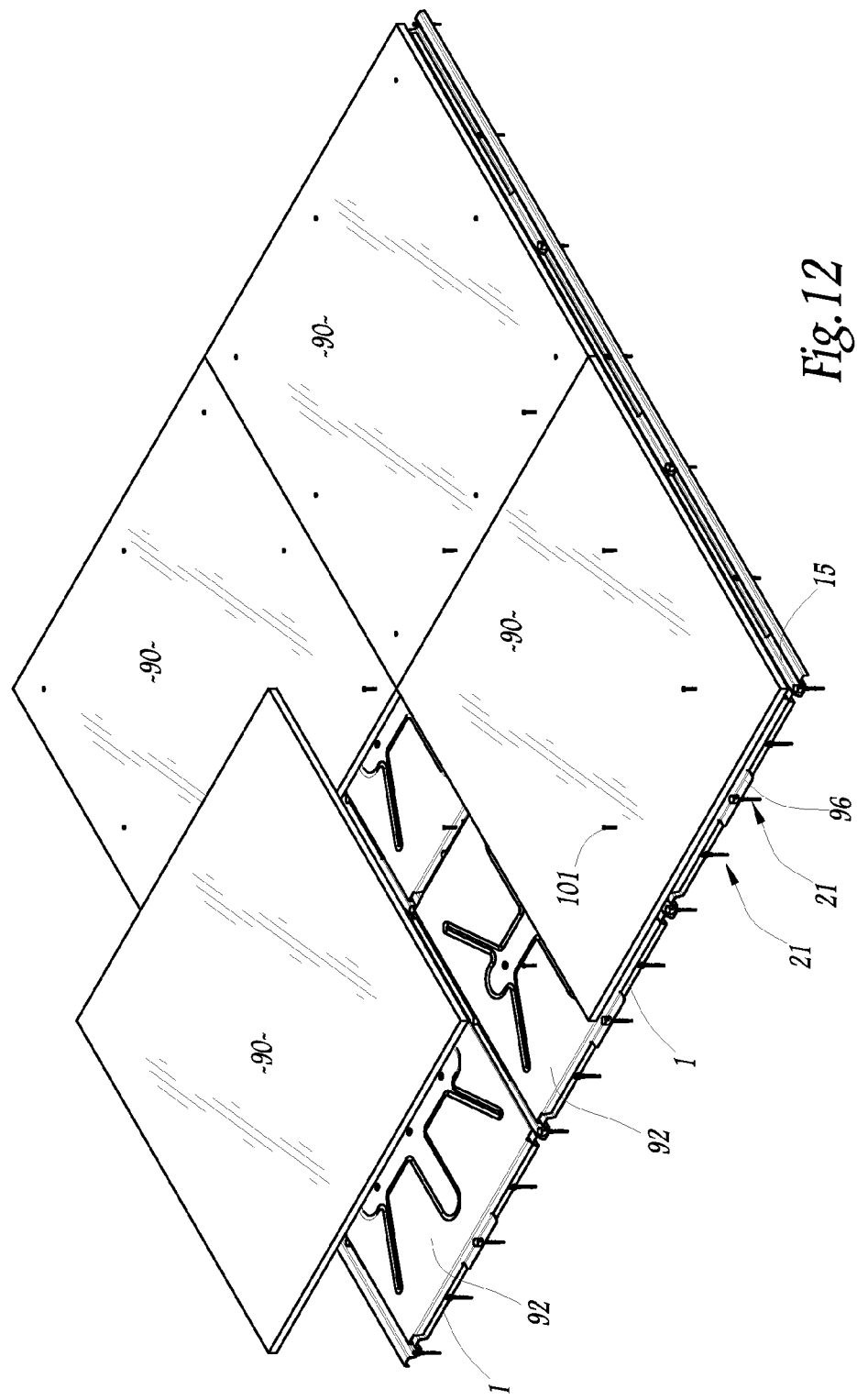
FIG. 12 is a perspective view, on another scale, similar to that in FIG. 9, of the accessories forming the support, fastened on to assembled sheets, receiving other accessories one of which is illustrated in the pre mounting position.

In one embodiment represented in the FIGS. 11 and 12, an accessory 92 is represented with a shape and dimensions similar to those of the panel 9. This accessory is present in the form of a panel 92, hereinafter referred to as a "cassette", and equipped not only with means for fastening on the sheet 1, that is the tabs 15 to 19, identical to those of the panel 9, but also with the appropriate fastening means that provide the ability to attach, in a removable manner, one or more element(s) on to the panel 92, such as a projector, a speaker, a flower pot, a planter, the letter in relief, or even a panel 90, 91 These appropriate means comprise, on one side 93 of the cassette 92 intended to be visible, in the absence of the element 92 when the support cassette is mounted on the sheet 1, a series of counterbores.

In particular, the panel 92 includes a central counterbore 94 formed parallely to two parallel sides 95, 96 of the panel 92. On either side of this central counterbore 94, extend other counterbores, either perpendicular to the counterbores 94, like the counterbores 97, or inclined like the counterbores 98, 99. All of the counterbores 94, 97, 98, and 99 thus have a star or tree configuration. The drilled holes 100 are provided in the central counterbore 94. By way of a variant, other drilled holes are provided on the other counterbores 97, 98, 99. Each counterbore is adapted, by virtue of its shape and/or dimensions for receiving another accessory to be fastened in a detachable manner, on to the cassette 92.

Such a cassette 92 is intended, when in place on the sheet, to form a detachable mounting bracket, for mounting other accessories, while itself being removable, without this impairing the sealing tightness of the attachment between the sheet 1 and the structure or compromising the physical integrity and mechanical strength of the sheet 1.

FIG. 12 thus illustrates the installing in place of the panels 90 on the cassettes 92, the latter being mounted on the assembled sheets 1. In this case, the fastening of the panels 90 is achieved by known means, for example by making use of screws 101. In fact the mounting of the panel 90 on the cassette 92 is carried out without contact with the sheet 1, in a manner similar to the mounting of accessories by making use of support bars 8, various different known means of mounting are readily applicable.

Thus, in all the embodiments previously described above, in an advantageous manner and in order to limit the creation of holes in the sheet 1, the fastening attachment for definitive attaching of the sheet 1 on the structure and the fastening means for removable fastening of the accessory on to the sheet are carried by one single member, the rod 21, of which the head 213 is provided with a fastening means for removably fastening the accessory. This is, for example as illustrated in the various figures, a threading.

By way of a variant not shown, the head of the rod 21 is provided with a female thread, a snap action fastening device, a bayonet device, velcro bands or other devices that enable the mounting of an accessory on the head of the rod, it being understood that the nut 22 is adapted to the configuration of the head.

Figure 13:
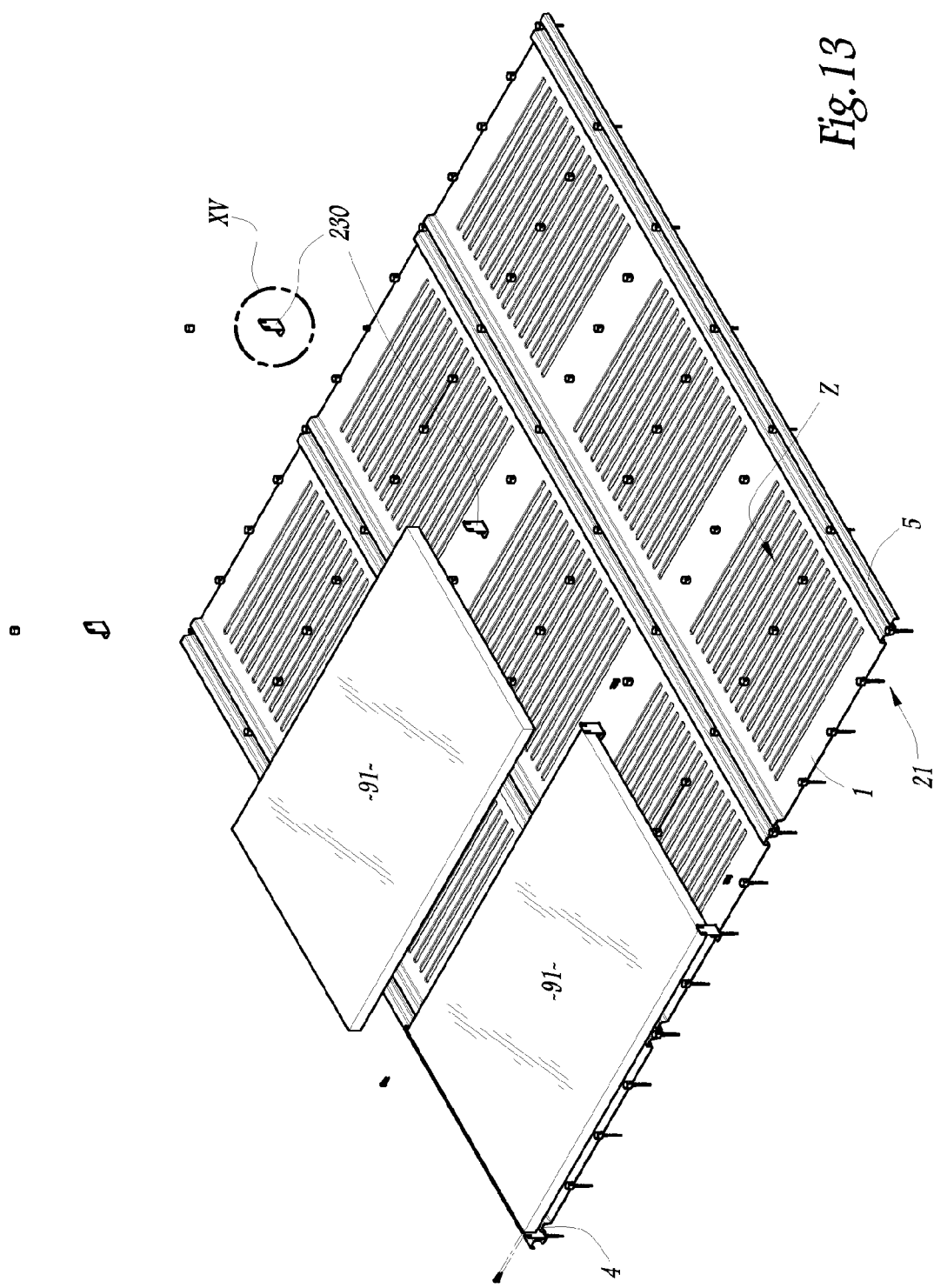
FIG. 13 is a perspective view, similar to that in FIG. 9 and on the same scale, another type of accessory being illustrated mounted and in position of pre mounting on accessories forming the support members in accordance with another embodiment of the invention.

FIG. 13 illustrates another embodiment of the invention wherein the means for fastening an accessory on the sheet include, in addition to the head 213 of the fastening attachments 21, an intermediate member. By way of a variant, not shown, multiple intermediate members may be provided.

This embodiment is illustrated by the attaching of rectangular panels 91 on the assembled sheets 1, it being understood that it also concerns the fastening of square panels 90 or other accessories, as long as these latter are free of tabs 15 and 19.

The attachment of the panels 91 on the sheets 1 is effected by the tabs 230 as illustrated in the FIG. 15. These tabs 230 have an L shaped configuration. One limb 231 of each tab 230 is supported on the body 6, at the level of the zones 70. This limb 231 is provided with an orifice capable of allowing the insertion of the head 213 of one of the rods 21. The limb 231 is held in place, in a removable manner, on the sheet 1 by the nut 22, in similar fashion to the holding of an accessory 9 or a support member 8.

The other limb 232 of the tab 230 extends in opposite direction away from the sheet 1 relative to the limb 231, perpendicularly to the body 6, towards the top when looking at the FIG. 13. This limb 232 is adapted to form a mounting bracket for attachment to a lip 110 of a panel 91. The lip is attached on to the 110 limb 232 by known means, for example by means of screws or rivets.

By way of a variant, the fastening may be permanent, for example by welding or gluing. In this case, the removal of the panel 91 entails separation of the tab 230 from the sheet 1. In other words, the tab 230 is then an integral part of the accessory to be mounted.

In the embodiment shown in FIG. 13, a contiguous mounting of the panels 91 is carried out, as in the embodiment illustrated in the FIG. 10 but by interposing an intermediate member between the rod 21 and the accessory 91, that is to say the tab 230.

What is claimed is:

1. A device for covering at least one structure in a building, comprising:
   at least one metal sheet suitable for covering at least one section in a surface of the structure, wherein the at least one metal sheet has a first face that faces the surface of the structure, and a second face that is opposite side the first face of the metal sheet,
   at least one one-piece accessory suitable for being attached onto a receiving area that is arranged on the second face of the metal sheet, the accessory being configured in the form of a panel or cassette, which is square or rectangular and which forms a decorative element in and of itself when attached onto the receiving area, and
   a plurality of fastening attachments definitively attaching the metal sheet to the structure and removably attaching the accessory onto the receiving area,
   wherein each of the fastening attachments comprises:
   (i) a rod, which is inserted through the metal sheet and comprises as one piece, the following:
      an attaching section adapted to be definitively fastened into the structure through the metal sheet,
      a clamp, which has a clamping face adapted to be supported on the second face of the metal sheet for applying the first face of the metal sheet against the structure when the attaching section is fastened into the structure through the metal sheet so as to permanently and tightly attach the metal sheet to the structure, and a head which is separated from the attaching section by the clamp and which is adapted to be removably fastened to the accessory so as to assemble or disassemble the accessory on the receiving area once the metal sheet is attached to the structure by the attaching section, without affecting the structural integrity of the metal sheet nor the integrity and sealing tightness of the attachment of the metal sheet to the structure by both the attaching section and the clamp, (ii) a holder which is adapted to cooperate in a removable manner with the head of the rod for clamping the accessory, in the direction towards the metal sheet, against the clamp of the rod so as to hold in place the accessory on the rod.

2. The device according to claim 1, wherein the receiving area and the fastening attachments are arranged in order to enable the assembly of a plurality of accessories on to the surface of the structure, in accordance with a predetermined visual motif or design.

3. The device according claim 1, wherein the metal sheet comprises at least one longitudinal rib and the receiving area comprises at least one receiving area portion that is parallel to this rib.

4. The device according to claim 1, wherein the metal sheet comprises at least two parallel longitudinal ribs and said receiving area comprises at least one transverse receiving area portion that is located between the two ribs of the metal sheet.

5. The device according to claim 4, wherein a plurality of transverse receiving area portions are provided, each of them being each capable of receiving an accessory having an elongated form and extending transversely between the ribs.

6. The device according to claim 1, wherein the head of the rods is externally threaded and the holder is a nut screwed on to the head.

7. The device according to claim 1, wherein the head of the rod of each fastening attachment includes a terminal indentation for manoeuvring the rod in order to fasten the attaching section into the structure when attaching the metal sheet to the structure.

8. A building structure, being covered with the device according to claim 1, a plurality of accessories being attached onto the receiving area of the device by forming one or more visual motifs or patterns selected or determined on the basis of a pre-established design.

9. The device according to claim 1, wherein the metal sheet is a cladding sheet.

10. The device according to claim 1, wherein the plurality of the fastening attachments is arranged along an edge of the metal sheet.

11. The device according to claim 1, wherein the attaching section of the rod is threaded.

12. The device according to claim 1, wherein the clamp is a flange.

13. The device according to claim 6, wherein the nut is capped and usable as protective cover for the head.

14. The device according to claim 6, wherein the nut is provided with notches or grooves for maneuvering the nut in order to screw the nut on to the head.

15. The device according to claim 1, wherein each of the fastening attachments further comprises a sealing gasket provided around the attaching section of the rod and under the clamp of the rod.

* * * * *